No. 734,903. PATENTED JULY 28, 1903.
J. G. LEWIS.
HALTER.
APPLICATION FILED DEC. 18, 1901.
NO MODEL.
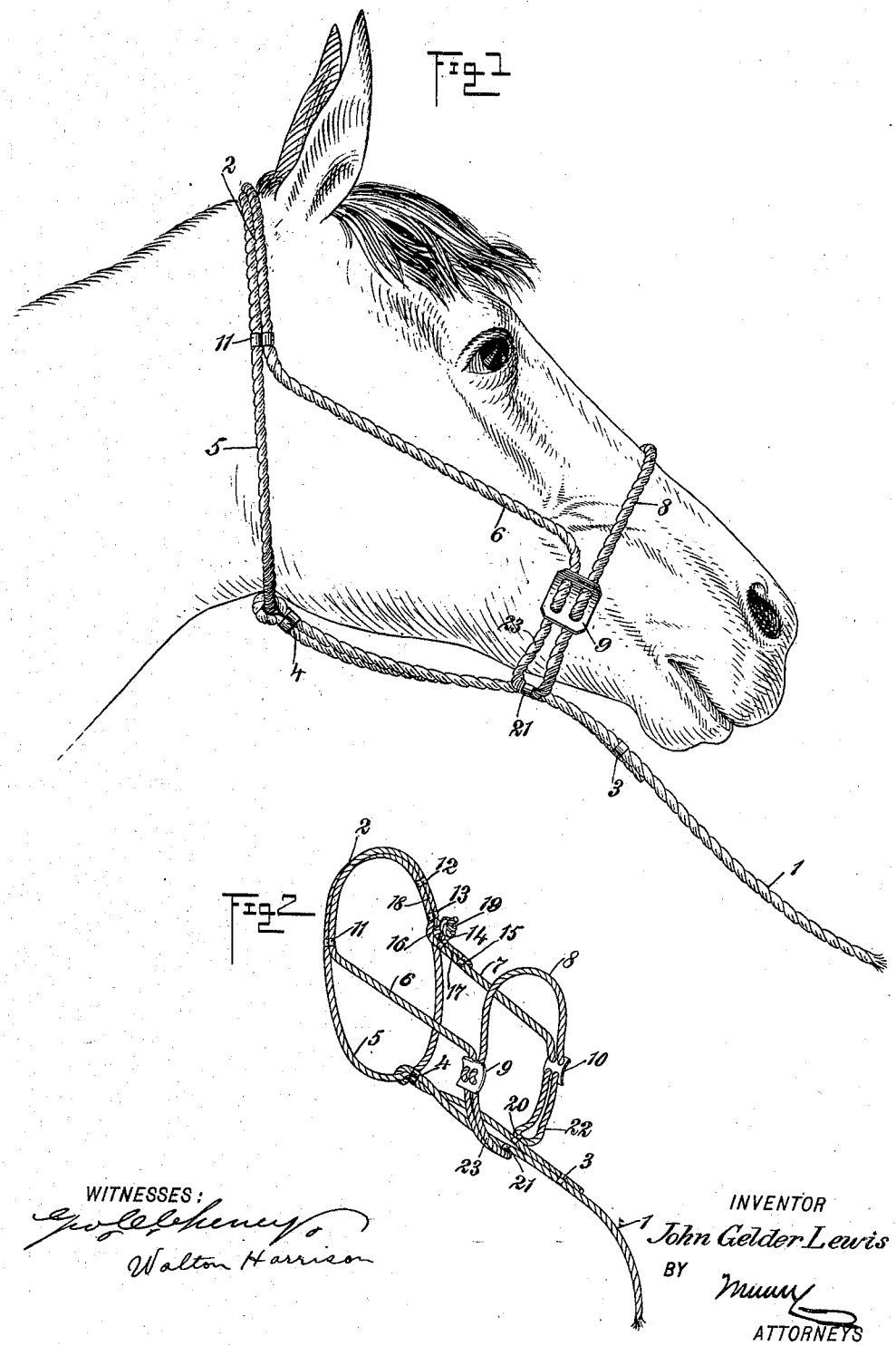
WITNESSES:
INVENTOR
John Gelder Lewis
BY
ATTORNEYS No. 734,903. Patented July 28, 1903.

UNITED STATES PATENT OFFICE.

JOHN GELDER LEWIS, OF FAIRFIELD, NEBRASKA.

HALTER.

SPECIFICATION forming part of Letters Patent No. 734,903, dated July 28, 1903.

Application filed December 18, 1901. Serial No. 86,393. (No model.)

*To all whom it may concern:*

Be it known that I, JOHN GELDER LEWIS, a citizen of the United States, and a resident of Fairfield, in the county of Clay and State of Nebraska, have invented a new and Improved Halter, of which the following is a full, clear, and exact description.

My invention relates to halters, the object being to produce a neat, simple, and efficient device composed entirely of two pieces of rope and readily adjustable to the heads of different-sized horses. My device also allows considerable freedom to the jaws of the animal.

Reference is to be had to the accompanying drawings, forming a part of this specification, in which similar characters of reference indicate corresponding parts in both the figures.

Figure 1 is a side elevation showing my halter as applied to the head of a horse, and Fig. 2 is a perspective view of the halter upon a somewhat-reduced scale.

The halter consists of two ropes 1 2. The rope 1 is doubled upon itself and secured by clasps 3 and 4, so as to constitute a flexible tie-strap having two members, allowing the animal to move his jaws quite freely. This tie-strap engages the other rope 2, which is so formed as to constitute cheek-pieces 6 7, a nose-piece 8, and the several other parts of the halter. Buckles 9 10 engage the rope, as shown, and are slidably mounted thereon. Clasps 11, 12, 13, 14, and 15 secure the folds of the rope together. A plurality of loops 16 17 18 are formed by the doubling of the rope, so that the knot 19 can be readily slipped between the two members of the rope, as shown in Fig. 2. This affords a secure fastening which is adjustable—that is to say, the knot 19 can be removed from the loop 16 and secured either in the loop 17 or 18. This renders the throat-latch 5 adjustable. The throat-latch is rendered further adjustable by the fact that the knot 19 can be pulled a considerable distance through either of the loops 16 17 18 and untied, a new knot being tied at a different point. The clasps 20 and 21 secure the jaw-straps 22 and 23 to the two members of the bifurcated tie-strap.

The operation is as follows: The buckles 9 10 are slipped upward or downward, as desired, thus raising the cheek-pieces 6 and 7, so as to fit upon the head of any-sized horse. The throat-latch 5 is next adjusted, which can be done by either of the two methods above set forth. The tie-strap being bifurcated and engaging the jaw-straps allows the animal to eat or move his jaws otherwise without inconvenience, as before stated. Moving the buckles 9 and 10 upward of course raises and shortens the cheek-pieces 6 and 7 relatively to the nose-piece 8, while at the same time changing the size of the entire front portion of the halter. It will be observed, therefore, that I have devised a simple and efficient form of halter which can be cheaply constructed and is not liable to break. It can be operated by a farm hand of ordinary intelligence.

Having thus described my invention, I claim as new and desire to secure by Letters Patent—

1. A halter comprising two flexible cords, one of which is doubled upon itself and secured by clasps so as to form a tie-strap having two members movable relatively to each other to allow freedom of the animal's jaws, the other of said cords being doubled upon itself to form a plurality of loops, and also to form jaw-straps, said jaw-straps being connected to said tie-straps, the latter of said cords being so coiled as to form a head-strap, a nose-piece, cheek-pieces, and a throat-latch.

2. A halter comprising two flexible cords, one of which is doubled upon itself and secured by clasps so as to form a tie-strap having two members movable relatively to each other to allow freedom of the animal's jaws, the other of said cords being doubled upon itself to form a plurality of loops, and also to form jaw-straps, said jaw-straps being connected to said tie-straps, the latter of said cords being so coiled as to form a head-strap, a nose-piece, cheek-pieces, and a throat-latch, said throat-latch terminating at one end in a knot, said knot being free to engage said loops independently to adjust the length of said throat-latch, and means controllable at will for adjusting the position of said cheek-pieces relatively to said nose-piece.

In testimony whereof I have signed my name to this specification in the presence of two subscribing witnesses.

JOHN GELDER LEWIS.

Witnesses:
F. D. HASTINGS,
CHAS. H. EPPERSON.